(12) United States Patent
Kusmierek

(10) Patent No.: US 10,882,227 B2
(45) Date of Patent: Jan. 5, 2021

(54) FOAM MIX-HEAD BUSHING AND METHOD OF MANUFACTURING A VEHICLE INTERIOR PANEL WITH THE BUSHING

(71) Applicant: Faurecia Interior Systems, Inc., Auburn Hills, MI (US)

(72) Inventor: Mark Kusmierek, Beverly Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 253 days.

(21) Appl. No.: 15/987,740

(22) Filed: May 23, 2018

(65) Prior Publication Data

US 2019/0358868 A1 Nov. 28, 2019

(51) Int. Cl.
| | | |
|---|---|---|
| *B29C 44/34* | (2006.01) | |
| *B29C 45/20* | (2006.01) | |
| *B29C 44/12* | (2006.01) | |
| *B60R 13/02* | (2006.01) | |
| *B29L 31/30* | (2006.01) | |
| *B29K 75/00* | (2006.01) | |
| *B29K 23/00* | (2006.01) | |
| *B29K 105/04* | (2006.01) | |
| *B29K 623/00* | (2006.01) | |

(52) U.S. Cl.
CPC ........ *B29C 44/351* (2013.01); *B29C 44/1233* (2013.01); *B29K 2023/00* (2013.01); *B29K 2075/00* (2013.01); *B29K 2105/04* (2013.01); *B29K 2623/12* (2013.01); *B29L 2031/3041* (2013.01); *B60R 13/02* (2013.01)

(58) Field of Classification Search
None
See application file for complete search history.

(56) References Cited

U.S. PATENT DOCUMENTS

| | | | | |
|---|---|---|---|---|
| 3,912,234 | A * | 10/1975 | Peter | G05D 11/132 366/262 |
| 4,743,188 | A * | 5/1988 | Gray | B29C 33/0077 425/123 |
| 4,839,117 | A * | 6/1989 | Swenson | B29C 44/143 264/101 |
| 4,883,227 | A * | 11/1989 | Maas | B05B 1/28 239/120 |
| 4,925,106 | A * | 5/1990 | Maas | B05B 11/0005 239/333 |
| 4,950,154 | A * | 8/1990 | Moberg | B29C 45/26 219/421 |
| 5,083,913 | A * | 1/1992 | Marsilio | B29C 33/0077 425/568 |
| 5,234,167 | A * | 8/1993 | Martin | B05B 7/0056 239/343 |
| 5,397,060 | A * | 3/1995 | Maas | B05B 7/0062 239/333 |

(Continued)

*Primary Examiner* — Cachet I Proctor
(74) *Attorney, Agent, or Firm* — Reising Ethington P.C.

(57) ABSTRACT

A bushing for a foam mix-head includes an injection port wall surrounding a vestigial area for foam accumulation, a substrate opening transition segment configured to be situated with an opening of a substrate, a seal housing, and a seal seated in a seal seat of the seal housing. The seal helps prevent leakage during a foaming operation, such as when manufacturing a vehicle interior panel having a foam layer between a skin layer and a substrate.

14 Claims, 1 Drawing Sheet

(56) References Cited

U.S. PATENT DOCUMENTS

| | | | | |
|---|---|---|---|---|
| 5,462,204 A | * | 10/1995 | Finn | B29B 7/7404 |
| | | | | 222/137 |
| 5,921,471 A | * | 7/1999 | Vivier | B05B 7/0018 |
| | | | | 239/428.5 |
| 2006/0019086 A1 | * | 1/2006 | Biewer | B29C 44/1233 |
| | | | | 428/304.4 |
| 2008/0315533 A1 | * | 12/2008 | Janotta | B29C 44/58 |
| | | | | 277/646 |
| 2009/0246505 A1 | * | 10/2009 | Evans | B32B 5/20 |
| | | | | 428/316.6 |

* cited by examiner

FOAM MIX-HEAD BUSHING AND METHOD OF MANUFACTURING A VEHICLE INTERIOR PANEL WITH THE BUSHING

TECHNICAL FIELD

The invention relates to bushings used with foam mix-heads for manufacturing vehicle interior panels.

BACKGROUND

Many vehicle interior panels include a foam layer between a skin layer and a substrate, sometimes with one or more interlayers. The foam layer may be injected as a foam precursor into an opening in the substrate. A bushing can be used between the foam mix-head and the substrate opening, but seals for the bushing often need replacement with every foam injection, or they have a structure which slows manufacturing or is prone to leakage. Leakage can burden the manufacturing process as cured foam needs to be removed from the tool surfaces between injection processes.

U.S. Pat. No. 5,083,913 to Marsilio discloses a bushing for a mix-head for molding a plastic material to the underside of a small sanitary fixture such as a sink or lavatory. The bushing includes a polymeric coating on an entire inner wall of the main body. The resilient polymeric coating may be difficult to replace if needed. U.S. Pat. No. 4,743,188 to Gray et al. discloses an inflatable seal clamp which is formed as an annular ring with a pressurizable passage connected to a source of selectively applied pressure. With the passages pressurized, an apex on the inside diameter of the ring will apply a highly localized pressure to the mix head for sealing engagement. Applying air pressure to the ring may require a more complex manufacturing system.

SUMMARY

In accordance with an embodiment, there is provided a bushing for a foam mix-head, comprising, a main bushing body, an injection port wall surrounding a vestigial area for foam accumulation, a substrate opening transition segment configured to be situated with an opening of a substrate, and a seal housing that surrounds the injection port wall and is connected to the injection port wall via the substrate opening transition segment. The seal housing includes first and second opposing side walls, the first opposing sidewall being connected to the substrate opening transition segment and the second sidewall being connected to the main bushing body. The seal housing further includes a seal seat between the first and second opposing sidewalls, and a seal seated in the seal seat of the seal housing.

In some embodiments, the injection port wall has a draft angle between 10°-30°, inclusive.

In some embodiments, the injection port wall and the first opposing sidewall of the seal housing both diverge from the substrate opening transition segment.

In some embodiments, the first and second opposing sidewalls diverge from the seal seat.

In some embodiments, the seal housing is a truncated triangular semi-toroid.

In some embodiments, the seal is a silicone ring seal that surrounds the injection port wall.

In some embodiments, the seal has a compressed height which is smaller than a non-compressed height when the bushing is mounted on the opening of the substrate.

In some embodiments, the seal contacts an inverse cone dock of the substrate when the bushing is installed on the opening of the substrate.

In some embodiments, a planar lip on the inverse cone dock directly contacts the seal.

In some embodiments, the seal has a round cross-sectional shape when the bushing is not mounted on the opening of the substrate, and an oblong cross-sectional shape when the bushing is mounted on the opening of the substrate.

In some embodiments, the oblong cross-sectional shape has two opposing seal walls.

In some embodiments, one of the opposing seal walls directly contacts a planar lip on the opening of the substrate when the bushing is installed on the opening of the substrate.

In accordance with another embodiment, a method of making an interior panel for a vehicle, the interior panel having a skin layer, a substrate, and a foam layer between the substrate and the skin layer. The method comprises the step of aligning a bushing with an opening in the substrate. The bushing includes a seal housing having first and second opposing side walls, the first opposing sidewall being connected to a substrate opening transition segment and the second sidewall being connected to a main bushing body. The seal housing further includes a seal seat between the first and second opposing sidewalls and a seal seated in the seal seat. The method further comprises the steps of sealing the opening in the substrate with the bushing by contacting the seal with a lip in the substrate, positioning a foam mix-head near the bushing, and injecting a foam material from the foam mix-head into the opening in the substrate to form the foam layer between the substrate and the skin layer.

In some embodiments, the lip is a planar lip on an inverse cone dock and the seal directly contacts a planar wall of the planar lip.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

Described below is a bushing for a foam mix-head, and a vehicle interior panel manufactured using the bushing and foam mix-head. The bushing includes a particularly configured seal housing and seal that helps prevent leakage of foam material, such as the liquid foam precursor used for the foam layer of the vehicle interior panel. The bushing also includes various features that facilitate efficient attachment and removal from the substrate of the vehicle interior panel or the substrate of a mold that is used to manufacture the vehicle interior panel. In one embodiment, a compressible silicone ring seal interfaces with an inverse cone dock of the substrate to help prevent foam from leaking into undesirable areas and slowing the manufacturing process.

Figure 1:
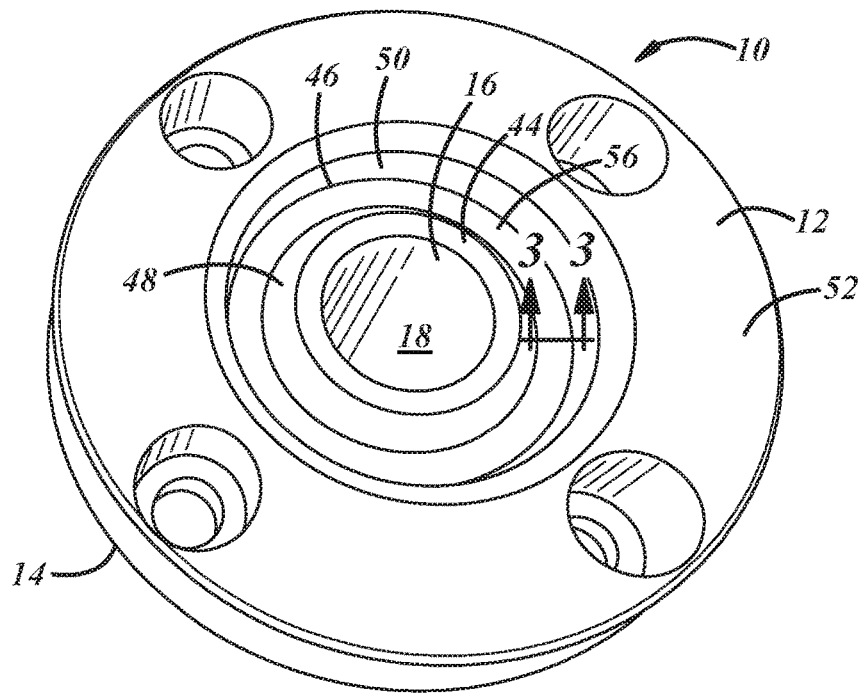
FIG. 1 is a perspective view of a substrate interface side of a bushing for a foam mix-head in accordance with one embodiment.
Figure 2:
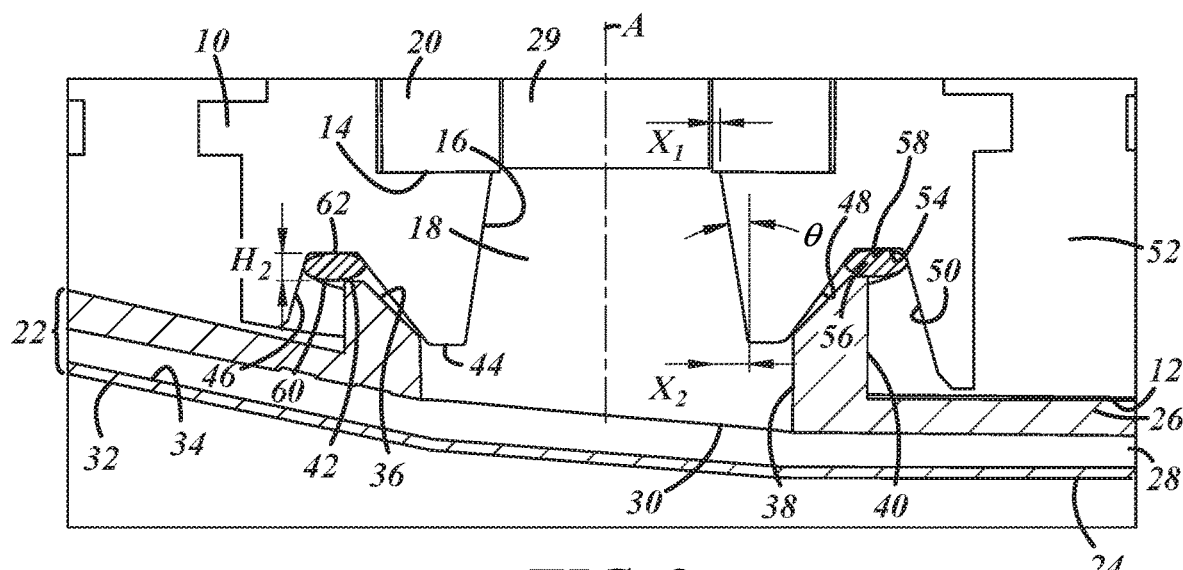
FIG. 2 is a cross-section view of the bushing of FIG. 2 when installed on a substrate of a vehicle interior panel.

FIG. 1 illustrates the bushing 10. The bushing 10 may be made out of any operable material, including steel or aluminum to cite two examples. The bushing 10 includes a substrate interface side 12, which is shown in FIG. 1. The substrate interface side 12 generally faces a substrate when in use, and depending on the manufacturing process, the substrate may be a mold substrate, such as when the foaming operation takes place through a mold. In another embodiment, the substrate is a layer or part of the component itself that is being manufactured. The bushing 10 includes the substrate interface side 12 and an opposite mix-head interface side 14, as shown in FIG. 2. In the illustrated embodiment of FIG. 2, which is detailed further below, the substrate is the actual substrate of the vehicle interior panel such that the substrate interface side 12 generally faces the vehicle interior panel during the foaming operation. It should be noted, however, that the bushing 10 may be used with other substrates or to make other foamed components, such as automotive seats, seals or gaskets, etc.

With reference to FIGS. 1 and 2, the bushing 10 has an injection port wall 16. The injection port wall 16 directly or indirectly surrounds a vestigial area 18 for foam accumulation during the foaming process. The injection port wall 16 accommodates a foam mix-head 20. While the injection port wall 16 in the illustrated embodiment has an annular shape to accommodate the annular shaped foam mix-head 20, other shapes or configurations may be used, and may vary depending on the type or structure of the mix-head. As shown more particularly in FIG. 2, the injection port wall 16 is inclined relative to a foam injection axis A by a draft angle θ which can help facilitate removal of the mix-head 20 and/or the bushing 10 after the foaming process. In the illustrated embodiment the draft angle θ is about 20°, but is advantageously between about 10° and 30°. The draft angle θ results in the injection port wall 16, and in some embodiments, the vestigial area 18, having a smaller radius toward the foam mix-head 20 and a larger radius toward the substrate interface side 12. This leads to a smaller region $X_1$ between the injection port wall 16 and an interior port of the mix-head 20 and a larger region $X_2$ between the injection port wall 16 and an interior port of the mix head 20 toward the substrate interface side 12. Additionally, to help with removal, the injection port wall 16 may be polished prior to the foaming process.

With reference to FIG. 2, during manufacture, the foam mix-head 20 delivers foam material through the injection port along the injection axis A into the part to be manufactured, such as a vehicle interior panel. FIG. 2 includes a cross-sectional view of a portion of one example of a vehicle interior panel 22 that includes a skin layer 24 arranged to cover a substrate 26 and an interposed foam layer in the space 28 between the skin layer 24 and the substrate 26. The substrate 26 includes an opening 30 such that when the bushing 10 is installed, the foam mix-head 20 can inject foam material through the vestigial area 18 surrounded by the injection port wall 16 to create the foam layer located in a space 28 between the skin layer 24 and the substrate 26. Reference numeral 28 may designate the space 28 for foam (pre-foaming operation) or the injected foam layer 28 itself (post-foaming). Typically, during operation, a piston 29 inside the foam mix-head 20 injects the foam precursor material and purges the inlet at the end of the injection shot. The piston 29 is in the full-down position, whereby it can engage past inlets in the body of the mix-head 20 to stop free-flow and mixture of precursor constituents, and then fully purge the last mixture into the space 28 and seal backflow into the inlet. The multi-layer interior panel 22 is then removed when the tool opens and the part is demolded. Advantageously, an intact foam vestige is left in the vestigial area 18 and stays with the substrate 26, leaving no remainder that could inhibit the next shot of precursor. The multi-layer vehicle interior panel 22 may be any type of panel having a visible outer side 32 exposed to the interior of a vehicle passenger cabin when installed in the vehicle, such as an instrument panel, door panel, console lid, arm rest, pillar cover, steering wheel panel, seat covering, etc.

The skin layer 24 is the outermost layer of the panel 22 and includes the visible outer side 32 of the panel with an opposite inner side 34 facing toward the substrate 26. The primary function of the skin layer 24 is to provide a resilient, long-lasting exposed surface within the vehicle with aesthetic appeal to occupants of the passenger cabin, including desirable visual characteristics such as color, shape, and texture. The skin layer 24 may thus include design features visible at the outer side 32, such as an embossed pattern or a paint film in the desired color. The skin layer 24 may also at least partly provide the panel 22 with desired tactile characteristics in the likeness of furniture upholstery, such as a soft-touch or smooth feel. In some cases, the skin layer 24 is formed with synthetic materials configured with aesthetic characteristics imitating other more expensive materials such as leather. Other interlayers or components may be included at or near the skin layer 24, depending on the desired implementation.

The substrate 26 is typically the most rigid of the illustrated panel layers and thereby provides structural support for the overlying layers at desired locations within the vehicle via attachment to other vehicle structures. Fiberglass-reinforced polypropylene having a thickness of 2 mm to 4 mm is one example of a suitable substrate 26, but various other types of materials and material combinations and/or different thickness ranges can be employed in a similar manner. As described above, the substrate 26 includes a substrate opening 30 for the insertion of foam material. The opening 30 may be structured as an inverse cone dock 36 having walls 38, 40 which extend away from the other layers of the vehicle interior panel 22. The walls 38, 40 meet at a planar lip portion 42. In some embodiments, the inverse cone dock 36 of the substrate 26 has an additional extension that mimics the shape of the injection port wall 16.

The foam layer 28 can assist the skin layer 24 in providing desired tactile characteristics to the panel 22 in the form of elastic cushioning that compresses when a force is applied to the outer side 32 of the panel 22 and decompresses when the force is removed to return the skin layer to its original position. The foam layer 28 can also provide sound deadening and/or have a non-uniform thickness to fill space between the skin layer 24 and the substrate 26 when the respective contours of the skin layer and substrate are different from each other. In the illustrated example, the foam layer 28 is a backfilled or a closed pour, foam-in-place material layer formed by introducing a foam material, such as a liquid foam precursor, into a space between the skin layer 24 and the substrate 26, with at least the skin layer constrained in the desired final shape in a foam molding tool. The foam material expands to fill and take the shape of the space and cures to form the foam layer 28. One suitable foam layer material is polyurethane foam formed from a liquid precursor material comprising a polyol and a diisocyanate. Other foam materials (e.g., polyolefin-based) are possible, as are other foaming processes (e.g., use of a heat-activated foaming agent). The foam layer 28 may range in thickness from 1 mm to 10 mm, can be separately provided and adhered with adjacent material layers.

Because the foam material for the foam layer 28 is often quite sticky or tacky, the bushing 10 can help seal the opening 30 of the substrate 26 such that the foam material is generally prevented from leaking undesirably. To help abate leaking, the bushing 10 includes a substrate opening transition segment 44 configured to be situated within the opening 30 of the substrate 26 and a seal housing 46 that surrounds the injection port wall 16 and is connected to the injection port wall 16 via the substrate opening transition segment 44. The substrate opening transition segment 44 may be a separate, planar junction, as shown, or it may be a more curved or apex-like portion, depending on the desired implementation.

The seal housing 46 includes first and second opposing side walls 48, 50, with the first opposing sidewall 48 being connected to the substrate opening transition segment 44, and the second sidewall being connected to the main bushing body 52. In this embodiment, the main bushing body 52 is an annular mounting body that surrounds the seal housing 46 and is configured to be attached, such as via bolts or the like, to the foam mix-head 20. A seal seat 54 in the seal housing 46 is located between the first and second opposing side walls 48, 50 to accommodate the seal 56. The seal seat 54 has a planar seal seat surface 58 that generally opposes or faces the substrate 26. More particularly, the planar seal seat surface 58 generally opposes or faces the planar lip portion 42 of the inverse cone dock 36 of the substrate opening 30. In this embodiment, the seal housing 46 is a truncated triangular semi-toroid that encircles the main injection axis A. This structure can help more desirably compress the seal 56 when the bushing 10 is installed on the substrate 26. Additionally, the truncated triangular semi-toroid shape mimics the shape of the inverse cone dock 36 such that the walls 38, 40 extend into the truncated triangular semi-toroid void created by the seal housing 46.

Figure 3:
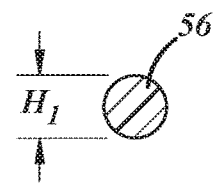
FIG. 3 is a cross-section view of the seal of the bushing illustrated in FIGS. 1 and 2, taken along line 3-3 in FIG. 1.

The seal 56 helps block a potential leak path between the opening 30 of the substrate 26 and the bushing 10. FIG. 3 is a cross-section of the seal 56 taken along line 3-3 in FIG. 1. The cross-section view of FIG. 3 shows the seal 56 in an uncompressed state having a height $H_1$. In this embodiment, the seal 56 has a round or circular cross-sectional shape, which becomes a more oblong or oval shape when the bushing 10 is installed, as shown in FIG. 2. Accordingly, the seal 56 is compressed to a height $H_2$ when installed for the foaming operation. It should be noted that the drawings are not necessarily to scale, but that the height $H_2$ when the seal is compressed 56 is smaller than the height $H_1$ when the seal 56 is not compressed. This compression forms two opposing seal walls 60, 62. The seal wall 60 directly contacts the planar lip portion 42 of the inverse cone dock 36 of the substrate opening 30. The seal wall 62 directly contacts the planar seal seat surface 58 of the seal housing 46. Accordingly, the seal 56 is compressed between, or entirely blocks, the potential leak path between the substrate opening 30 and the bushing 10. In another embodiment, the seal has a hollow structure (e.g., a tube), which may be beneficial when a greater amount of compression or difference between $H_1$ and $H_2$ is desired.

To facilitate this compressibility, the seal 56 may be made from a resilient material. In one embodiment, the seal 56 is a silicone ring seal that surrounds the injection port wall 16, although it is possible to use other materials, such as rubber or another elastomeric material. Silicone may be particularly advantageous because it is less likely to stick with the foam material used for the foam layer 28, such as a polyurethane liquid foam precursor. Accordingly, a silicone seal 56 may positively prevent leaking during the foam precursor injection phase, and it can also minimize any buildup due to cured foam adhesion. Moreover, given the propensity of the seal 56 to resist buildup, it is possible to use the same seal 56 in multiple foaming operations, as opposed to other seals that attach to the substrate 26 and must be changed with each foaming operation. Seating the seal 56 in the structured seal housing 46 can help with this reusability. Over time, if the seal 56 does need to be replaced, use of a separate seal, such as the silicone ring seal 56, can allow for easier replacement than polymeric coated bushings or the like. It is possible in other embodiments, however, to have a coated or deposited seal 56 in the seal seat 58. The structure and configuration of seal 56 may be altered depending on the foaming operation parameters and/or the specifications of the part to be foamed.

To manufacture the vehicle interior panel 22, the bushing 10 is aligned with the opening 30 in the substrate 26. The opening 30 in the substrate 26 may be sealed with the bushing 10 by contacting the seal 56 with the planar lip portion 42 in the inverse cone dock 36 of the substrate 26. The foam mix-head 20 is positioned near the bushing 10, such that the foam mix-head is moved to generally surround the injection port wall 16. Foam material is then injected from the foam mix-head 20 into the opening 30 in the substrate 26 to form the foam layer 28 between the substrate 26 and the skin layer 24. After injecting a suitable amount of foam material, typically there is a foam accumulation or chunk that remains in the vestigial area 18 of the bushing 10. The draft angle θ which can create a variable radius between the top of the injection port wall 16 and the substrate opening transition segment 44 can help retain the foam accumulation. The foam accumulation preferably remains with the substrate 26, because if it is removed and remains with the foam mix-head 20, it must be cleaned out before another part is foamed.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A bushing for a foam mix-head, comprising:
   a main bushing body;

an injection port wall surrounding a vestigial area for foam accumulation;

a substrate opening transition segment configured to be situated with an opening of a substrate;

a seal housing that surrounds the injection port wall and is connected to the injection port wall via the substrate opening transition segment, wherein the seal housing includes first and second opposing side walls, the first opposing sidewall being connected to the substrate opening transition segment and the second sidewall being connected to the main bushing body, wherein the seal housing further includes a seal seat between the first and second opposing sidewalls; and a seal seated in the seal seat of the seal housing.

2. The bushing of claim 1, wherein the injection port wall has a draft angle between 10°-30°, inclusive.

3. The bushing of claim 2, wherein the injection port wall and the first opposing sidewall of the seal housing both diverge from the substrate opening transition segment.

4. The bushing of claim 1, wherein the first and second opposing sidewalls diverge from the seal seat.

5. The bushing of claim 4, wherein the seal housing is a truncated triangular semi-toroid.

6. The bushing of claim 1, wherein the seal is a silicone ring seal that surrounds the injection port wall.

7. The bushing of claim 1, wherein the seal has a compressed height which is smaller than a non-compressed height when the bushing is mounted on the opening of the substrate.

8. The bushing of claim 7, wherein the seal contacts an inverse cone dock of the substrate when the bushing is installed on the opening of the substrate.

9. The bushing of claim 8, wherein a planar lip on the inverse cone dock directly contacts the seal.

10. The bushing of claim 7, wherein the seal has a round cross-sectional shape when the bushing is not mounted on the opening of the substrate, and an oblong cross-sectional shape when the bushing is mounted on the opening of the substrate.

11. The bushing of claim 10, wherein the oblong cross-sectional shape has two opposing seal walls.

12. The bushing of claim 11, wherein one of the opposing seal walls directly contacts a planar lip on the opening of the substrate when the bushing is installed on the opening of the substrate.

13. A method of manufacturing an interior panel for a vehicle using the bushing of claim 1, the interior panel having a skin layer, the substrate, and a foam layer between the substrate and the skin layer, comprising the steps of:

aligning the bushing with the opening in the substrate;

sealing the opening in the substrate with the bushing by contacting the seal with a lip in the substrate;

positioning a foam mix-head near the bushing; and injecting a foam material from the foam mix-head into the opening in the substrate to form the foam layer between the substrate and the skin layer.

14. The method of claim 13, wherein the lip is a planar lip on an inverse cone dock and the seal directly contacts a planar wall of the planar lip.

* * * * *